US008310670B2

(12) United States Patent
Leon Fong et al.

(10) Patent No.: US 8,310,670 B2
(45) Date of Patent: Nov. 13, 2012

(54) METHOD FOR REMOVAL OF WAX FROM POROUS STONES IN HISTORICAL MONUMENTS

(75) Inventors: Betty Mireya Leon Fong, Nigran (ES); Aldara Pan Cabo, Vigo (ES); Stefano Chiussi, Vigo (ES); Esther Rebollar Gonzalez, Vigo (ES); Julia De La Asuncion Serra Rodriguez, Vigo (ES); Pio Manuel Gonzalez Fernandez, Vigo (ES)

(73) Assignee: Universidade de Vigo, Vigo (ES)

( * ) Notice: Subject to any disclaimer, the term of this patent is extended or adjusted under 35 U.S.C. 154(b) by 277 days.

(21) Appl. No.: 12/830,322

(22) Filed: Jul. 4, 2010

(65) Prior Publication Data

US 2011/0007308 A1    Jan. 13, 2011

Related U.S. Application Data

(60) Provisional application No. 61/223,719, filed on Jul. 8, 2009.

(51) Int. Cl.
*G01J 3/44* (2006.01)
*B08B 7/00* (2006.01)
(52) U.S. Cl. ........................................... 356/301; 134/1
(58) Field of Classification Search .................. 356/301, 356/317–319, 326, 369, 445; 134/1, 1.2; 250/372

See application file for complete search history.

(56) References Cited

U.S. PATENT DOCUMENTS

| | | | |
|---|---|---|---|
| 5,151,134 A | | 9/1992 | Boquillon et al. |
| 5,227,608 A | | 7/1993 | Yoshida |
| 5,482,561 A | * | 1/1996 | Yeung et al. ..................... 134/1 |
| 5,800,625 A | * | 9/1998 | Engelsberg et al. .............. 134/1 |
| 5,814,156 A | * | 9/1998 | Elliott et al. ....................... 134/1 |
| 5,851,842 A | * | 12/1998 | Katsumata et al. ............... 438/9 |
| 5,951,778 A | | 9/1999 | Wolbarsht et al. |
| 6,048,588 A | * | 4/2000 | Engelsberg .................... 427/554 |
| 6,335,208 B1 | * | 1/2002 | Lowry ............................. 438/4 |
| 6,678,050 B2 | * | 1/2004 | Pope et al. ..................... 356/435 |
| 7,170,029 B2 | | 1/2007 | Son |
| 7,342,235 B1 | * | 3/2008 | Harrison et al. .............. 250/372 |
| 7,514,015 B2 | * | 4/2009 | Elliott et al. .................... 216/65 |

OTHER PUBLICATIONS

Pan et al. Calibration of Raman Spectroscopy at 1064 nm for Beeswax Quantification. Applied Spectroscopy. vol. 61, No. 11, 2007.
Pan et al. Excimer laser removal of beeswax from galician granite monuments. Journal of Cultural Heritage 10 (2009) 48-52.

* cited by examiner

*Primary Examiner* — Sang Nguyen
(74) *Attorney, Agent, or Firm* — Mateo Aboy; Aboy & Associates PC

(57) ABSTRACT

Disclosed embodiments include methods for cleaning wax, substantially equivalent impurities, and other contaminants from porous stones in historical monuments and artworks using nondestructive means. According to one embodiment the method for removal of contaminants from porous stones using laser comprises the following method steps: (a) identifying regions of a contaminant on the porous stone monument; (b) characterizing the contaminant on the porous stone monument; (c) exposing the contaminant on the porous stone monument to irradiation from a laser characterized by a wavelength, a pulse length, a repetition rate, and a laser energy fluence determined and optimized for a given contaminant-porous stone system and the laser characteristics; and (d) adaptively evaluating the cleaning results by quantifying the thickness of the remaining contaminant.

10 Claims, 17 Drawing Sheets

| | | |
|---|---|---|
| 17±6 (μm) | 11±7 (μm) | 72±3 (μm) |
| 60±3 (μm) | 17±6 (μm) | 20±6 (μm) |
| 66±3 (μm) | 81±4 (μm) | 15±7 (μm) |

FIG. 4

TABLE 2

| Material | | Wavenumbers (cm$^{-1}$)[a] | Approximate assignment of vibrational mode |
|---|---|---|---|
| Granite | Beeswax | 2879 s | ν(CH$_2$) asymmetric |
| | | 2846 s | ν(CH$_2$) symmetric |
| | Quartz | 467 s | Stretching of 6-membered rings of SiO$_4$ |
| | | 206 m | |
| | | 128 m | |
| | Na–feldspar | 1083 w | Stretching of 4-membered rings of SiO$_4$ |
| | Biotite | 750 | Stretching of Si–O–Si |

[a] s: strong, m: medium, w: weak.

FIG. 11

METHOD FOR REMOVAL OF WAX FROM POROUS STONES IN HISTORICAL MONUMENTS

CROSS-REFERENCE TO RELATED APPLICATIONS

This application claims the benefit of U.S. Provisional Application No. 61/223,719 filed on 2010 Jul. 8 by the present inventors, which is incorporated herein by reference.

TECHNICAL FIELD

Disclosed embodiments relate to methods for cleaning stones in historical monuments and artworks. Specifically, they relate to methods for cleaning porous stones in historical monuments and artworks using laser.

BACKGROUND

The cleaning of artworks often involves the removal of dirt from damaged surfaces or fragile substrates. The traditional cleaning techniques such as water, chemical and mechanical cleaning can result in permanent damage of the substrates.

In many geographical areas where granite is widely available, traditional architecture in historical buildings utilizes granite stone composed by feldspar, quartz, and mica. As valuable monuments of significant cultural heritage started to present a disintegration of the granite stone in the outdoor walls, owing to chemical erosion, some restorers decided to apply molten beeswax on their granite surfaces to stop the imminent deterioration of the monuments. At first, this treatment was a good solution to consolidate the stone, but with time it resulted counterproductive. The wax layer on the surface does prevent rain water from penetrating the stone surface, but granite catches the damp from all of its uncoated surfaces. Through the irregularities in the beeswax film such as pores, water evaporation from the surface takes place, leading to a gradient of salt concentration inside the stone, and the movement of the salt solutions from the interior of the rocky mass towards the surface, hence precipitation of these salts occurs where the solubility product has been exceeded. Owing to crystallization of salts, and their accumulation beneath the beeswax layer, an intense surface disintegration of granite can be observed, so that the conservation of sculptured details of emblematic monuments is at risk.

Due to the delicate state of these stone monuments, a non-contact, selective, and environmental friendly cleaning technique is necessary to remove the waxy material. It is of critical importance to avoid the beeswax melting and its advance deeper into the granite cracks. Granite stone studies confirm that the porous stone network contains micro (r<3 μm) and macrofissures (r≧3 μm), however, the most abundant microfissures in Roan granite are those having widths of tenths of micron. Since the beeswax was applied by melting on the granite surface, it has penetrated the intricate granitic porous system, resulting in a rather complex "wax-stone" system. Consequently, the development of nondestructive methods for removing the wax with minimal impact to the historical piece presents several difficult problems to overcome and traditional chemical and mechanical cleaning techniques are not adequate. For instance, even the characterization of the beeswax thickness at the stone surface is very challenging. Several methods have been evaluated as means for beeswax characterization on artwork, such as gas chromatography, differential scanning calorimetry, Fourier transform infrared Spectroscopy, and X-ray diffraction. However, the main drawback of these methods is their destructive nature, since they require significant amounts of sample of the surface to be extracted. Therefore, they cannot be used for assessing the thickness of a wax layer on the surface of granite, as needed in the restoration field, especially if this novel method should eventually be used in-situ to evaluate in real time the efficiency of new cleaning techniques.

BRIEF SUMMARY OF THE INVENTION

Disclosed embodiments include methods for cleaning wax, substantially equivalent impurities, and other contaminants from porous stones in historical monuments and artworks using nondestructive means. The traditional cleaning techniques such as water, chemical, and mechanical techniques often result in permanent damage of the substrate and consequently are avoided. Due to the delicate state of stone monuments, a non-contact, selective, and environmental friendly cleaning technique is necessary to remove the waxy material.

According to one embodiment the method for removal of contaminants 104 from porous stones 106 using laser 100 comprises the following method steps: (a) identifying regions of a contaminant on the porous stone monument 200; (b) characterizing the contaminant on the porous stone monument 202; (c) exposing the contaminant on the porous stone monument to irradiation from a laser characterized by a wavelength, a pulse length, a repetition rate, and a laser energy fluence determined and optimized for a given contaminant-porous stone system and the laser characteristics 204; and (d) adaptively evaluating the cleaning results by quantifying the thickness of the remaining contaminant 206. The identification, characterization, irradiation, and evaluation can be done in-situ, and can be integrated in an interactive loop for the automatic control of the whole cleaning procedure.

BRIEF DESCRIPTION OF THE DRAWINGS

Disclosed embodiments are illustrated by way of example, and not by way of limitation, in the figures of the accompanying drawings.

FIG. 4 shows an illustration of the thickness of beeswax as measured by FT-Raman Spectroscopy.

FIG. 11 shows a Table with the Raman spectral interpretation of beeswax on Roan granite samples.

DETAILED DESCRIPTION

Disclosed embodiments include methods for cleaning wax and substantially equivalent impurities from porous stones in historical monuments and artworks using nondestructive means. Specifically, they relate to methods for removal of molten wax from porous stones such as Roan granite in humid environments. The following detailed description, without limitation, discloses specific embodiments for the specific case of beeswax and Roan granite monuments in humid environments. While particular embodiments are described, it is understood that after learning the teachings disclosed herein modifications and generalizations will be apparent to those skilled in the art without departing from the spirit of the disclosed embodiments. For instance, the various embodiments of the methods disclosed are applicable to other contaminant substances with properties substantially equivalent to beeswax and other substrates such as porous stones with substantially equivalent properties to Roan granite. Additionally, other contaminants may also be laser cleaned using the general method disclosed. These contaminants include lipids, mineral oils, organic oils, vegetable oils, natural resins, acrylic resins, biocolonies, black crusts, and synthetic adhesives and consolidants. Synthetic adhesives and consolidants include polyvinyl acetate (PVA), polyvinyl acetate (PVA) emulsions such as CMBond M2, acryloid B-72, cellulose nitrate (nitrocelluloid) such as duco, polyvinyl butyral, various polymethacrylates in an organic solvent such as elvacite 20/3, polymethacrylate emulsions such as bedacryl, and polyvinyl alcohol.

Figure 1:
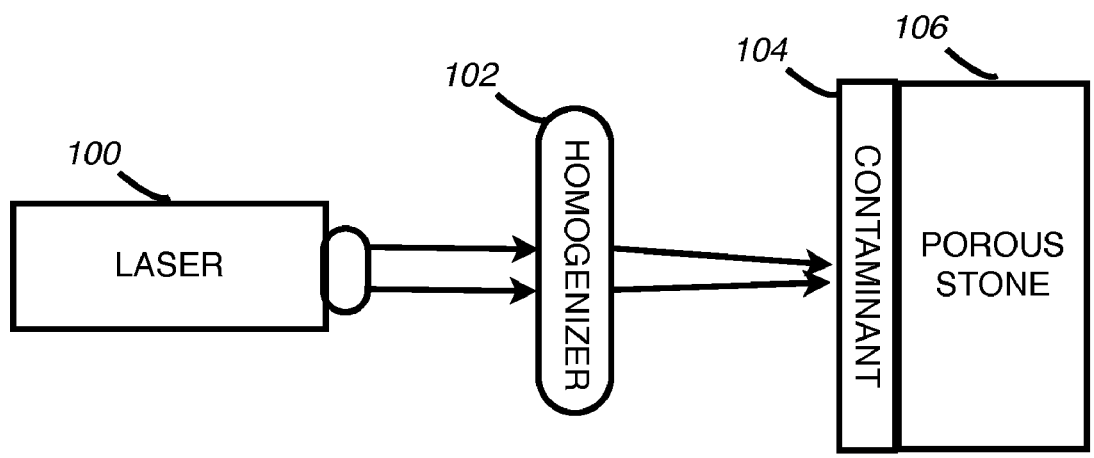
FIG. 1 shows a block diagram illustrating the method steps according to one embodiment.

FIG. 1 shows an embodiment, according to this embodiment the method for removal of contaminants from porous stones using laser comprises exposing through an optional homogenizer element such as a focusing lens 102 the contaminant 104 on the porous stone monument 106 to irradiation from a laser 100 characterized by a wavelength, a pulse length, a repetition rate, and a laser energy fluence determined and optimized for a given contaminant-porous stone system and the laser characteristics.

Figure 2:
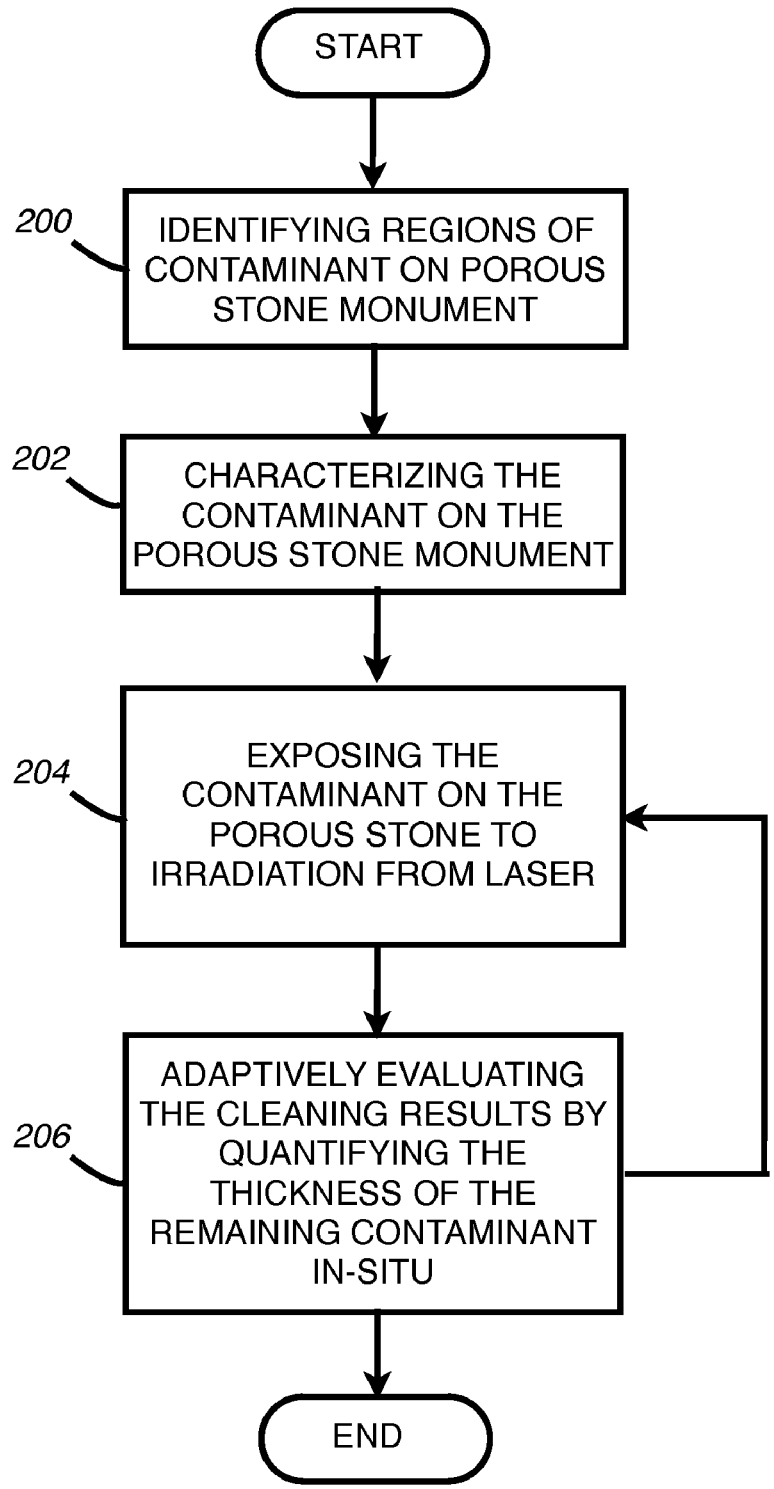
FIG. 2 shows a block diagram illustrating the method steps according to an alternative embodiment.

FIG. 2 shows another embodiment, according to this embodiment the method for removal of contaminants 104 from porous stones 106 using laser 100 comprises the following method steps: (a) identifying regions of a contaminant on the porous stone monument 200; (b) characterizing the contaminant on the porous stone monument 202; (c) exposing through an optional beam homogenizer element the contaminant on the porous stone monument to irradiation from a laser characterized by a wavelength, a pulse length, a repetition rate, and a laser energy fluence determined and optimized for a given contaminant-porous stone system and the laser characteristics 204; and (d) adaptively evaluating the cleaning results by quantifying the thickness of the remaining contaminant 206. The identification, characterization, irradiation, and evaluation can be done in-situ, and can be integrated in an interactive loop for the automatic control of the whole cleaning procedure. Below we describe an example of an experimental procedure followed to optimize the laser parameters according to one embodiment.

Figure 3:
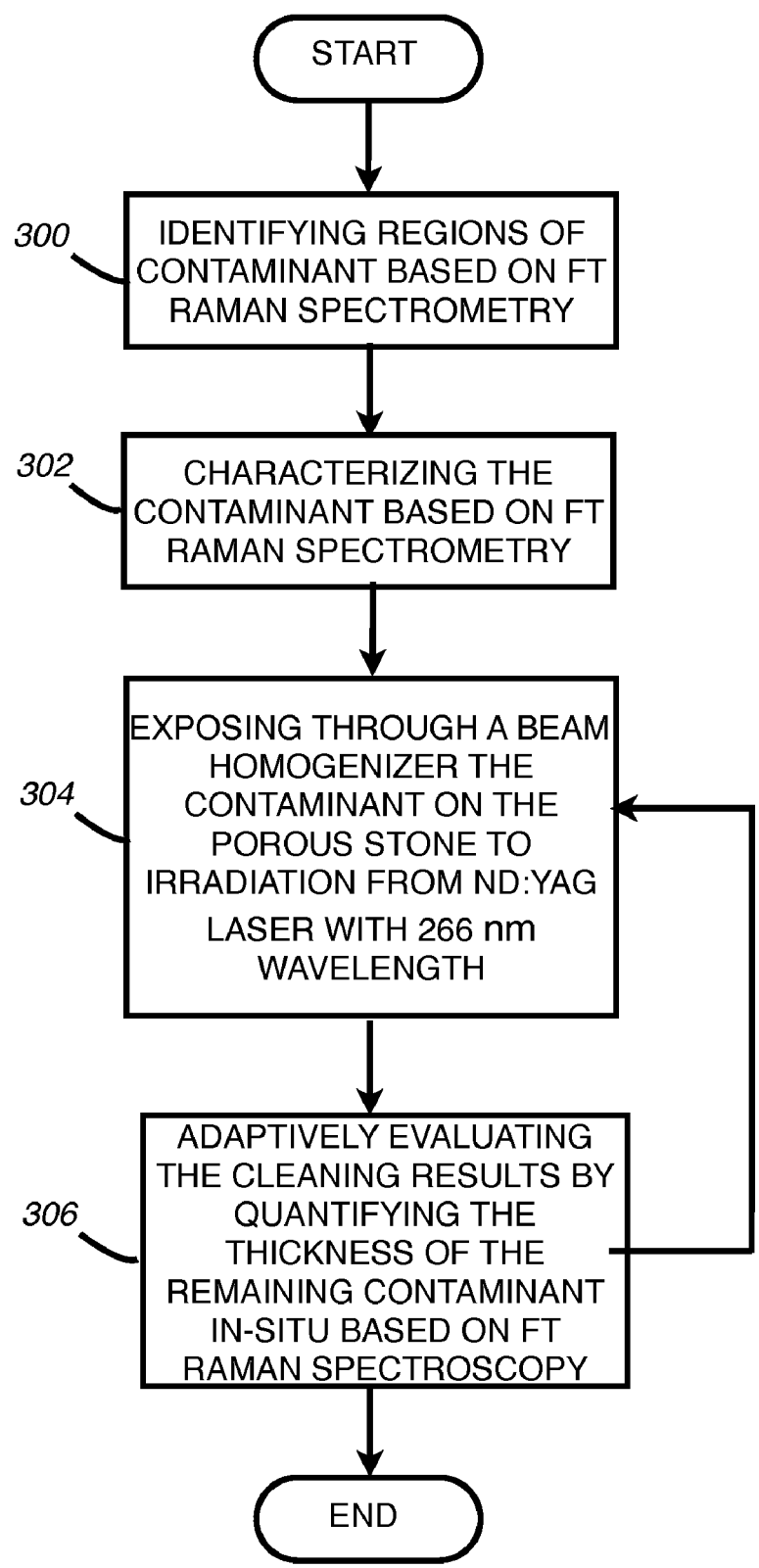
FIG. 3 shows a block diagram illustrating the method steps according to a third embodiment.

FIG. 3 shows another particular embodiment, according to this embodiment the method removal of contaminants 104 from porous stones 106 using laser 100 comprises the following method steps: (a) identifying regions of a contaminant on the porous stone monument using Fourier transform Raman spectrometry 300; (b) characterizing the contaminant on the porous stone monument using Fourier transform Raman spectrometry 302; (c) exposing through an optional beam homogenizer element the contaminant on the porous stone monument to irradiation from a laser characterized by a wavelength, a pulse length, a repetition rate, and a laser energy fluence determined and optimized for a given contaminant-porous stone system and the laser characteristics 204; and (d) evaluating the cleaning results by quantifying the thickness of the remaining contaminant using Fourier transform Raman spectroscopy 306.

Depending on the identification of the predominant composition of the contaminant surface layer to be eliminated, diverse laser types and laser wavelengths can be used ranging from UV to IR. According to an embodiment, and without limitation, the laser pulse duration is below 20 ns in order to achieve appropriate power density leading to laser ablation of the undesirable layer. Energy densities must be adjusted depending on the composition and thickness of the surface layer and the nature of the bottom substrate. Pulse repetition rates must be adjusted for efficiency of elimination and adequate control of the cleaning procedure by the operator.

In the particular case of removal of beeswax from Roan granite monuments in humid environments, according to one embodiment, and without limitation, the method for removal of beeswax from Roan granite monuments in humid environments comprises the following method steps: (a) identifying regions of the beeswax on the Roan granite monument using Fourier transform Raman spectrometry 300; (b) characterizing the beeswax on the Roan granite monument using Fourier transform Raman spectrometry to measure the beeswax thickness 302; (c) exposing the beeswax on the Roan granite monument to irradiation from a Nd:YAG (neodymium-doped yttrium aluminium garnet) laser characterized by a 266 nm 304 wavelength, a 6 ns pulse length, a constant repetition rate of 10 Hz, and an energy density of 350 mJ/cm$^2$ through a focusing lens placed between the Nd:YAG laser beam and the regions of said wax in order to ensure concentrated energy density inside the laser spot; and (d) evaluating the cleaning results by quantifying the thickness of the remaining beeswax using Fourier transform Raman spectroscopy 306. According to other embodiments, other wavelengths are employed including 1064, 532, and 355 nm, as well as other pulse lengths, repetition rates, and energy densities. The irradiation may be perpendicular to the substrate or other optimal angle.

According to an alternative embodiment employing an excimer ArF laser, and without limitation, the method for removal of beeswax from Roan granite monuments in humid environments comprises the following method steps: (a) identifying regions of the beeswax on the Roan granite monument using Fourier transform Raman spectrometry 300; (b) characterizing the beeswax on the Roan granite monument using Fourier transform Raman spectrometry to measure the beeswax thickness 302; (c) exposing the beeswax on the Roan granite monument to irradiation from an excimer ArF laser 204 characterized by a 193 nm wavelength, a 20 ns pulse length, a constant repetition rate of 1 Hz, and laser energy fluence ranging from 0.5 to 2 J cm$^{-2}$ through a UV homogenizer placed between the excimer ArF laser beam and the regions of the beeswax in order to ensure homogeneous energy density inside the laser spot; and (d) evaluating the cleaning results by quantifying the thickness of the remaining beeswax using Fourier transform Raman spectroscopy 306. The irradiation may be perpendicular to the substrate or other optimal angle.

A. Experimental Results and Testing.

The following description presents the experimental results and tests of a prototype according to one embodiment. This description is meant to illustrate the proposed method works as intended even for non-preferred prototype embodiments.

A.1. Test-Samples Preparation.

An experimental set of samples treated with molten beeswax was prepared on Roan granite, from which the renaissance frieze of the Cloister in the Cathedral of Santiago de Compostela was carved. The stone was obtained from architectural modifications of the Cloister, performed some hundred years ago. The fundamental composition of this granite is practically constant and it is quartz, microline, plagioclase, biotite and muscovite. The granite stone substratum has a porous network containing macro and micro fissures. The micro fissures can be as narrow as tenths of micron, and these are the most abundant ones in Roan granite.

The application of beeswax (Cofarcas, S.A) emulsified with the pigment (red cadmium, Johnson and Matthey) was carried out imitating the proceeding used by Chamoso Lamas in the sixties. The pigment was included in the molten beeswax to make visible the advance of the waxy material. The granite test samples (parallelepiped, 8×10×1 cm) were heated in a heater with a thermostat at 200° C.; at the same time we kept molten the red colored beeswax. Keeping the stone on the heater, we extended the wax with two run-overs of paintbrush over the granite sample. Thereafter the granite was cooled at ambient temperature.

A.2. Laser Cleaning Experiments.

The prepared samples were exposed to an excimer laser (ArF, 193 nm, 20 ns pulse length, LPX 200, Lambda Physik) in order to assess its effect on the granite and the beeswax. The samples were irradiated perpendicular to the surface in air. The pulse repetition rate was kept constant in all the cases at 1 Hz to avoid any possible heat accumulation. The laser energy fluence employed for the cleaning of beeswax over granite ranged from 0.5-2 Jcm$^2$ in series of 10 and 20 pulses.

An UV homogenizer (Microlas, Coherent) was used between the laser beam and the sample, in order to ensure homogeneous energy density inside the laser spot. It consists of two cylindrical lens (Suprasil 1) arrays plus a condenser lens. The optical elements are AR coated for 193 nm. The distance between arrays is 28 mm, getting a fixed spot size of 2.5 mm$^2$. The laser beam energy was measured by a radiant power meter (OPHIR PE50-DIF-U, ORIEL 70260 from Spectra Physics).

A.3. Analytical.

The obtained samples were examined by Stereoscopic Zoom Optical Microscope (SMZ-10A, Nikon) and Scanning Electron Microscope (JEOL JSM-6700 f), in order to analyze the degree of beeswax advance in the granite porous system. All tests were visually evaluated in order to detect alterations in surface texture and damage or loss of the granite surface components. For the evaluation of the cleaning results, the quantification of the thickness of the remaining beeswax was assessed by Fourier Transform (FT)-Raman Spectroscopy using the quantification protocol described below, whereby the beeswax Raman peak at 2879 cm$^{-1}$ spectra was correlated to the wax thickness. Raman spectra were collected using a polarized Raman spectrometer (BRUKER RFS 100) equipped with a Nd:YAG laser (1.06 μm) pumped by two diode lasers. Each Raman spectrum corresponded to an accumulation of 512 scans with an exposure time of 60 s for each scan with a laser power of 500 mW. The instrument resolution was 4 cm$^{-1}$. The spectrometer is equipped with a microscope (NIKON OPTIPHOT-2) with a magnification of 100× to obtain an excitation beam spot with a diameter of 30 μm. After recording the spectra, the software OPUS, version 5.5, has been used to acquire quantified data.

The beeswax absorbance spectrum was measured at room temperature by a UV-VIS-NIR spectrophotometer (Cary 5000 Scan, Varian) in the region covering the excimer laser wavelengths (193 and 248 nm). The sample measured was a beeswax solution in hexane (0.1 gL$^{-1}$), which was placed in a quartz tube. The reference used was a quartz cuvette of path length 1 cm containing the corresponding solvent.

A.4 Experimental Results.

The laboratory samples were designed to provide a realistic model for the treated relief of the Renaissance Frieze. The beeswax thickness was determined by Raman Spectroscopy over a stone sample made in the laboratory, by measuring 9 different spots in a 3×3 grid in an area of 1 cm$^2$ FIG. 4. Their thicknesses range goes from 10 to 100 μm, and this range of values was corroborated by electron microscopy in cross-sections of samples FIG. 5. With the elaboration of the test samples, we have succeeded in reproducing the worst situation that we can find in the renaissance frieze, thin beeswax layers over damaged granite, impossible to remove with mechanical methods without provoking damage to the substrate. The beeswax UV absorbance spectrum shows a high absorption coefficient around 193 nm FIG. 6. The measured value at 193 nm is 0.54, 85 times higher than the measured at the 248 nm KrF wavelength (0.006), at which the excimer laser has only twice the pulse energy of the emission at 193 nm. Therefore, the use of ArF wavelength was preferred.

Figure 7:
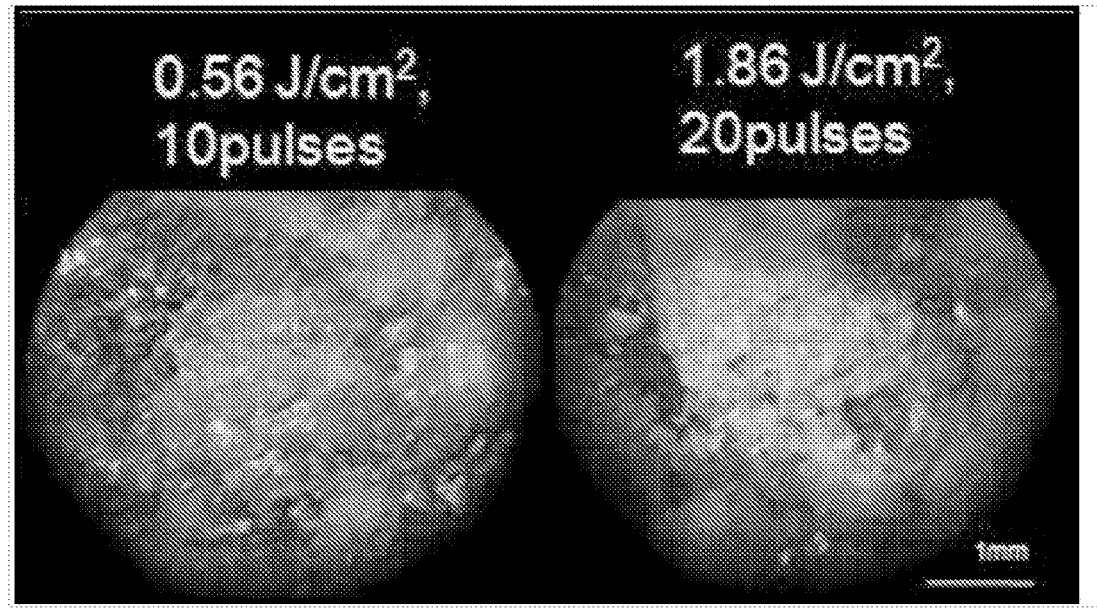
FIG. 7 shows the optical appearance of excimer laser irradiated granite with beeswax at minimum and maximum fluences, with different number of pulses. Left: partially cleaned. Right: removal of 87% of original wax layer.

ArF laser irradiation modified the visual appearance of the coated surfaces resulting in beeswax ablation or cleaning, depending on the fluence of irradiation and number of pulses FIG. 7. In the left figure, wax elimination is not observed in the irradiated spot; nevertheless the Raman analysis reveals the loss of certain amount of beeswax, which is negligible at naked eye. After the irradiation at 1.86 Jcm$^2$ and 20 pulses, the cleaned area is clearly visible, so that complete cleaning efficiency could be supposed; however Raman spectroscopy still detected remanent beeswax presence, only amounting 13% of the original wax layer, which could be remaining in the fissures.

Figure 8:
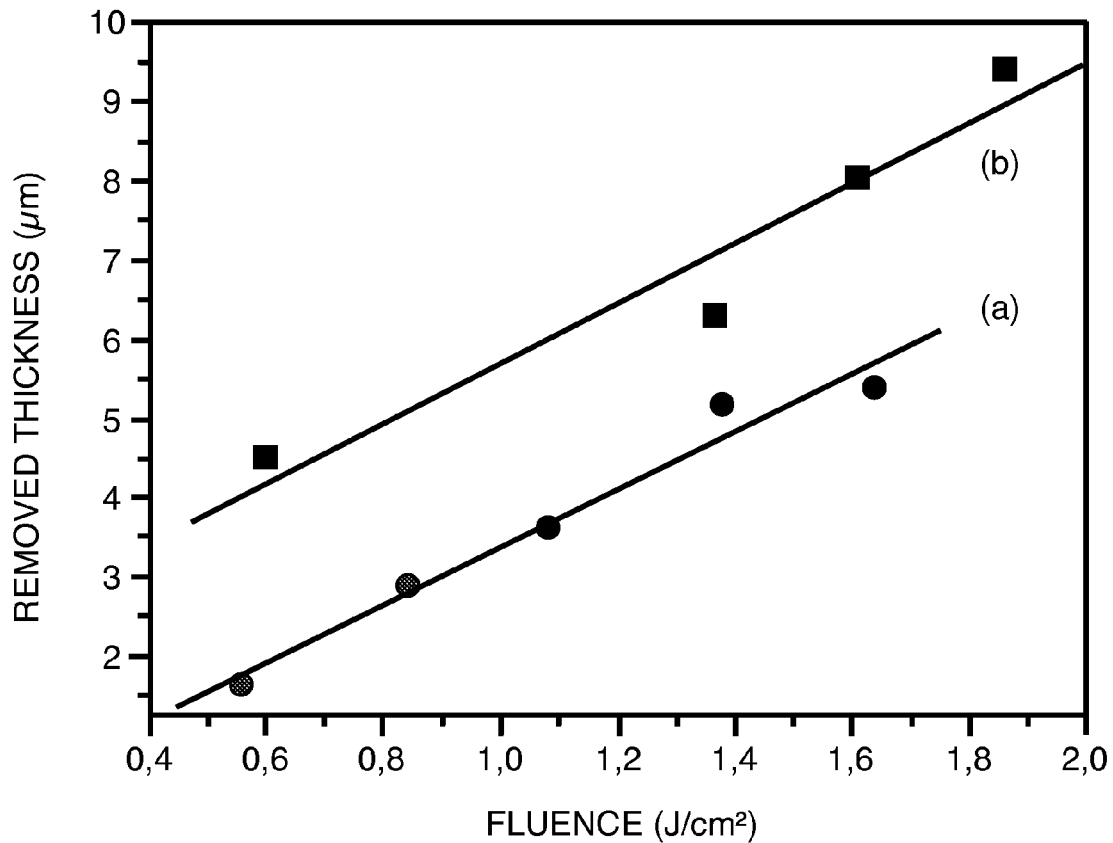
FIG. 8 shows the removed thickness of beeswax as a function of fluence using ArF laser at 193 nm, with a series of (a) 10 pulses and (b) 20 pulses.

The FT-Raman spectroscopic studies of the laser processing marks on beeswax treated granite, have allowed the measurement of the beeswax removed thickness FIG. 8. The Raman spectrum of the granite surface was recorded, before and after irradiation with the excimer laser. Using the calibration curve of the Raman peak versus the beeswax thickness, determined using the procedure detailed in this disclosure, we obtained the removed/ablated thickness of the waxy material. It is also possible to employ FT-Raman Spectroscopy for the in-situ control of the cleaning process. In order to study the cleaning performance as a function of laser fluence, the removed thickness was measured as a function of the density of energy FIG. 8. It is shown that the removal efficiency grows with an increase of the laser fluence.

By examination of the treated samples with a stereoscopic zoom microscope, no surface damage is detected after the laser cleaning, independently of the fluence value. The great absorbance of the beeswax at 193 nm prevented the laser beam penetration into the granite stone substrate.

Figure 9:
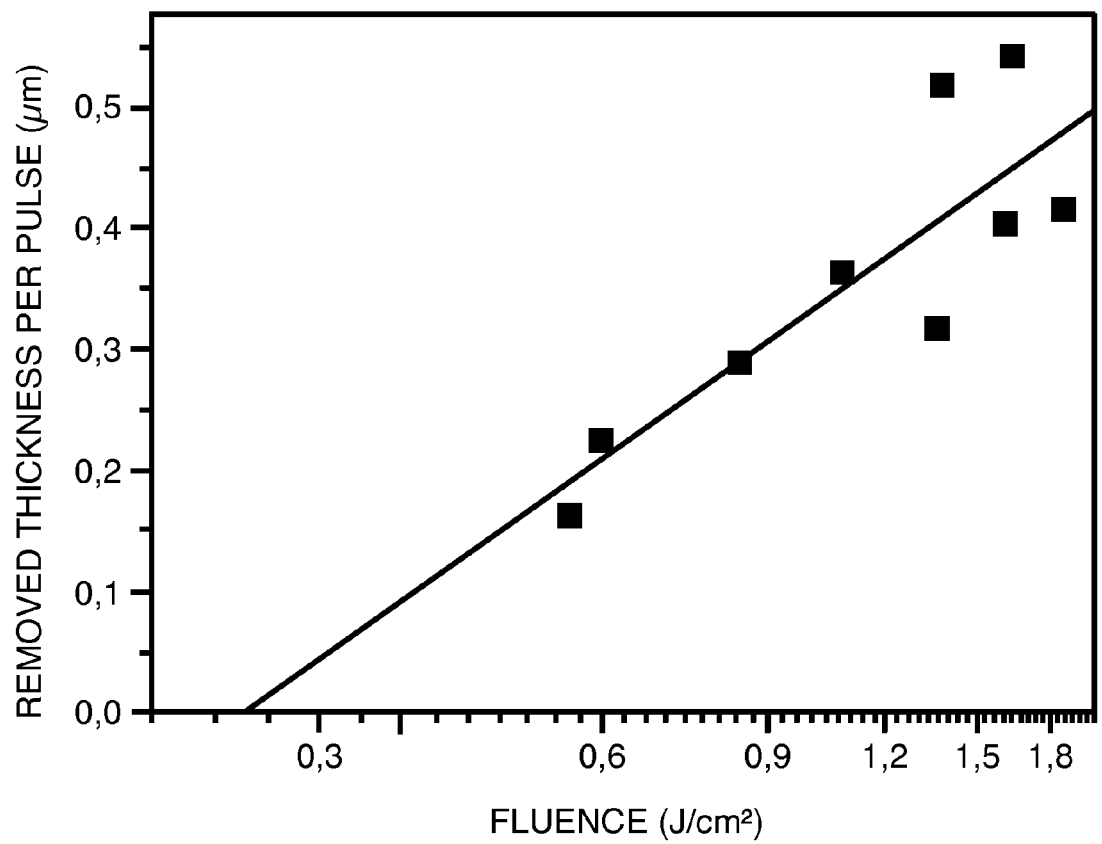
FIG. 9 shows the removed thickness per pulse of beeswax as a function of fluence using ArF laser at 193 nm. Threshold fluence for beeswax ablation at 193 nm, $F_{th}$=0.25 Jcm$^{-2}$.

FIG. 9 shows the removed thickness per pulse (ablation rate) as a function of fluence in logarithmic scale. The experimental points fit into a straight line. By extrapolation of the fitted line to zero ablated thickness, the threshold as the minimum laser fluence required to initiate ablation is found to be Fth=0.25 J cm$^2$.

B. Experimental Results and Testing the Method Steps of Identification and Characterization Of Beeswax Using Ft Raman Spectrometry.

The following description presents the experimental results and tests of a prototype of two method steps according to one embodiment, namely, the method steps required for the identification and the characterization of the beeswax using FT Raman spectrometry. This description is meant to illustrate the proposed method works as intended even for non-preferred prototype embodiments.

B. 1. Experimental Protocol Description.

Raman spectra were collected using polarized Raman spectrometer (BRUKER RFS 100) equipped with a Nd:YAG laser (1.064 μm) pumped by two diode lasers. For other contaminants, other possible laser excitation wavelengths can be optimized. Each Raman spectrum corresponded to an accumulation of 520 scans with an exposure time of 60 s for each scan. The spectrometer is equipped with a microscope (NIKON OPTIPHOT-2) with a magnification of 100× to obtain an excitation beam spot with a diameter of 30 μm. All spectra are obtained by focusing at the surface of the materials. After recording the spectra, the software OPUS version 5.5, has been used to acquire quantified data. Samples reproducing the waxed cloister frieze were prepared by melting pure beeswax over Roan granite stone obtained from architectural modifications of the Cloister, performed some hundred years ago. For calibration of the Raman spectra and testing the accuracy and robustness of the resulting analytical model, two different sets of samples with beeswax films of different thicknesses were prepared on aluminum plates: the calibration set and the validation set samples. Substrates were kept at 70° on a heater plate and the molten beeswax was applied with calibrated paint spreaders. The final thickness of the beeswax films was measured by contact profilometry (DEKTAK3ST VEECO). The thicknesses of the calibration samples were: 26.6±0.7 μm, 48.5±0.6 μm, 67.5±1.1 μm, 73.1±0.5 μm and 97.2±1.7 μm, and the thicknesses of the validation set samples were: 12.1±0.4 μm, 40.8±1.4 μm, 60.9±1.8 μm, 67.5±0.5 μm, 98.6±1.2 μm. Additionally a beeswax film with 180±10 μm thickness measured by a digimatic indicator (ABSOLUTE ID-S 1012, Mitutoyo) was incorporated to the validation set. The nylon plate (6×15×12 mm), from the accessory kit of the spectrometer (BRUKER), was selected as external reference to correct the Raman emission dependence on the laser beam power, because it presents an absorption band centered in the same frequency range where the beeswax has its characteristic identifying peak. Immediately after every measurement of a set of beeswax samples, at a certain laser power, the nylon spectrum was recorded.

To characterize the predictive ability of the elaborated model and the uncertainty of the predicted thicknesses, the Root Mean Square Error of Prediction (RMSEP) was calculated.

Figure 5:
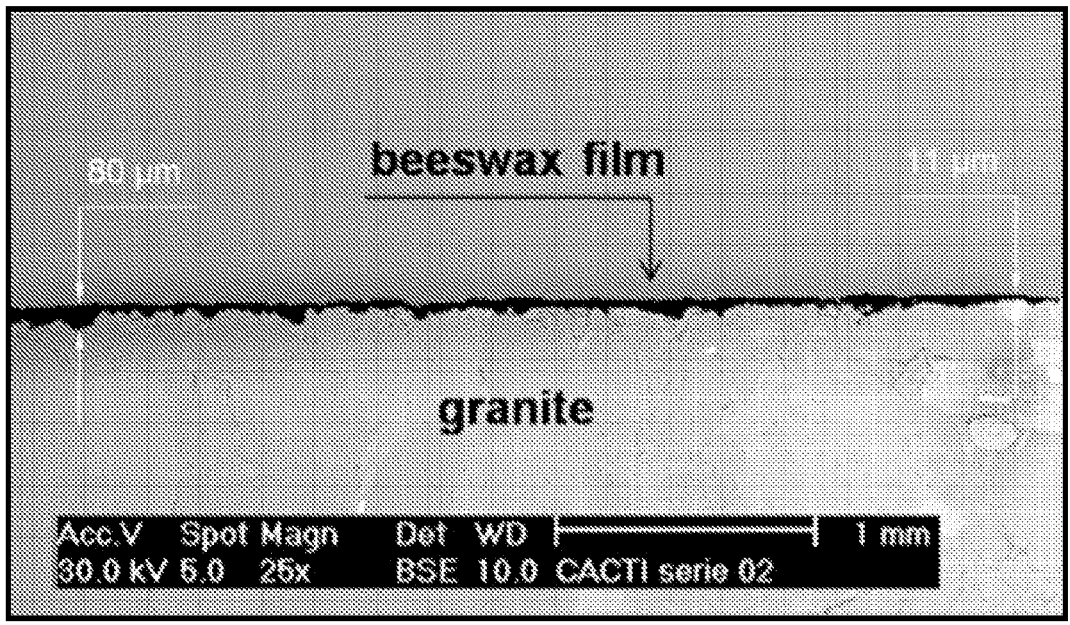
FIG. 5 shows a SEM backscattered image of the cross-section of a beeswax coating over Roan granite in test-samples.
Figure 6:
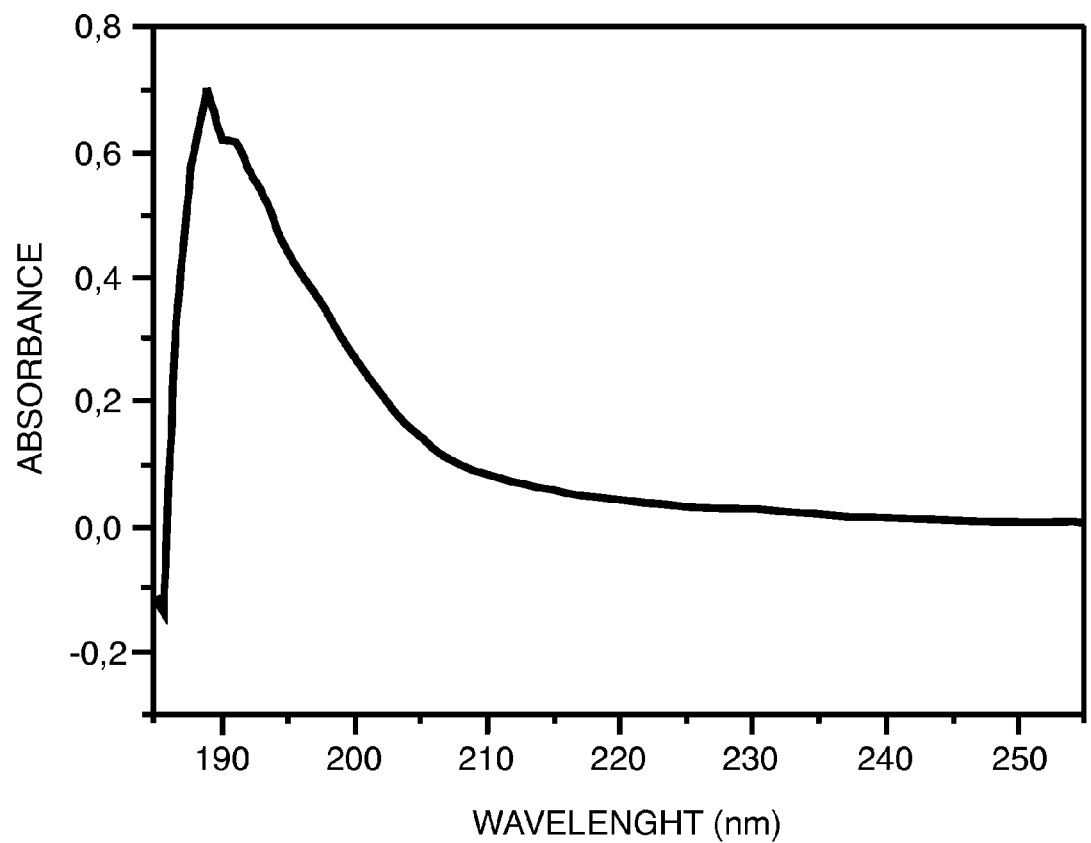
FIG. 6 shows the UV absorption spectrum of a beeswax solution in hexane (0.1 gL$^{-1}$).

For evaluation of the Raman measurements of wax in stone, backscattering images of electron microscopy (SEM, JEOL JSM-6700f) has been used to determine the beeswax thicknesses of typical cross-sections of samples (FIG. 5).

B. 2. Experimental Results.

B.2.1. Identification of Beeswax on Granite Stone.

The identification of beeswax on granite stone by using Raman spectrometry is based on the fact that both materials do not have overlapping spectra. In fact, no interference can be observed in the spectral features of these materials.

Figure 10:
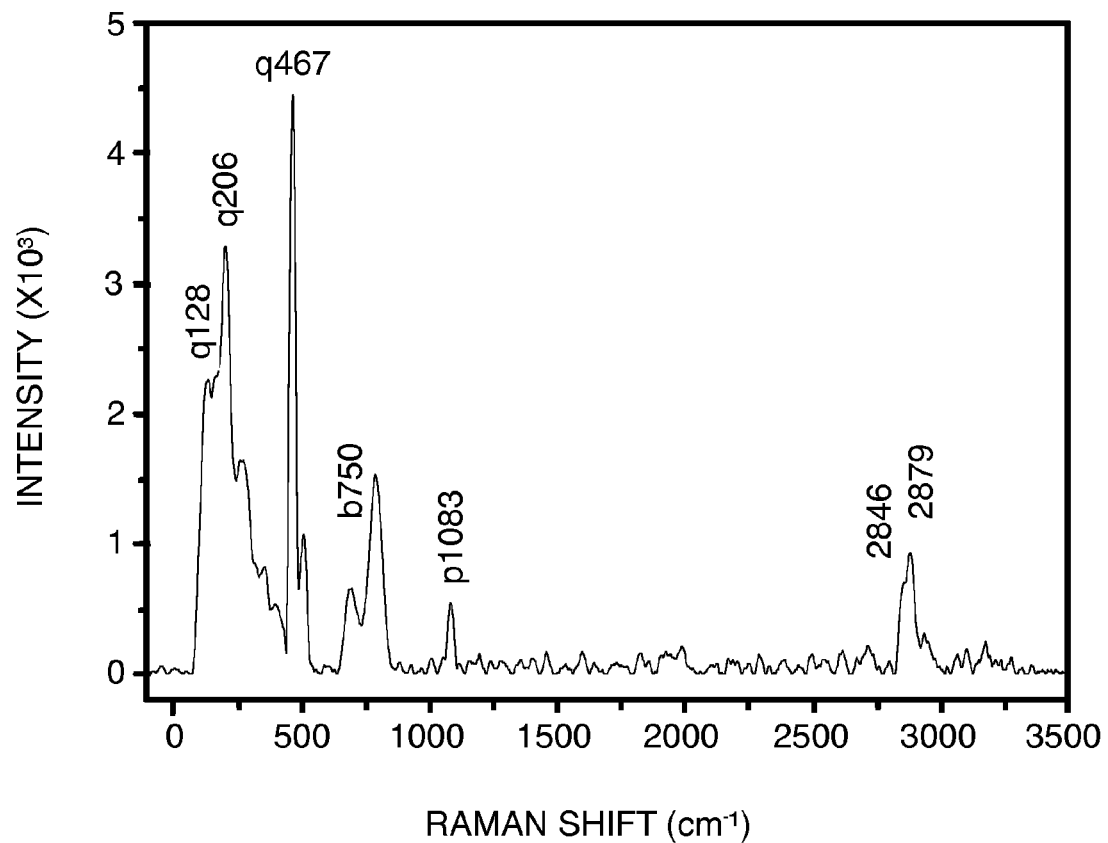
FIG. 10 shows the Raman spectrum of beeswax over Roan granite.

FIG. 10 shows the measured bands on a typical Raman spectrum of a Roan granite sample with beeswax on top. The Roan granite is composed mainly of quartz, microcline, plagioclase, biotite and muscovite. These minerals can be divided in two groups based on how silica units are linked together in the crystal structure: phyllosilicates (micas) and framework silicates (feldspars and quartz). Each granite component presents specific bands that work like fingerprints for these minerals. The 467 cm$^{-1}$ signal corresponds to the symmetric stretching modes of 6-membered rings of $SiO_4$ tetrahedral in quartz2, the strongest peak of quartz. Relative strong lines from quartz occur also at 128 and 206 cm$^{-1}$. The sodium feldspar, plagioclase presents a band at 1083 cm$^{-1}$. The Raman peaks in the spectral region of 800-600 cm$^{-1}$ arise from the vibratory modes of Si—$O_b$—Si bonds, which connect the SiO4 tetrahedral that form the mica layers; the biotite is identified by a doublet between 700 and 750 cm$^{-1}$. In this frequency range the typical beeswax Raman spectrum can be observed. The vibratory stretching mode from the aliphatic C—H can be observed over 2700 cm$^{-1}$ and 3000 cm$^{-1}$: the asymmetric band of v($CH_2$) at 2879 cm$^{-1}$, and its symmetric band at 2846 cm$^{-1}$. These bands are used to identify the presence of beeswax. Being the most intense one, we have selected the 2879 cm$^{-1}$ peak to quantify its layer thickness.

B.2.2. Quantification of Beeswax.

Figure 12:
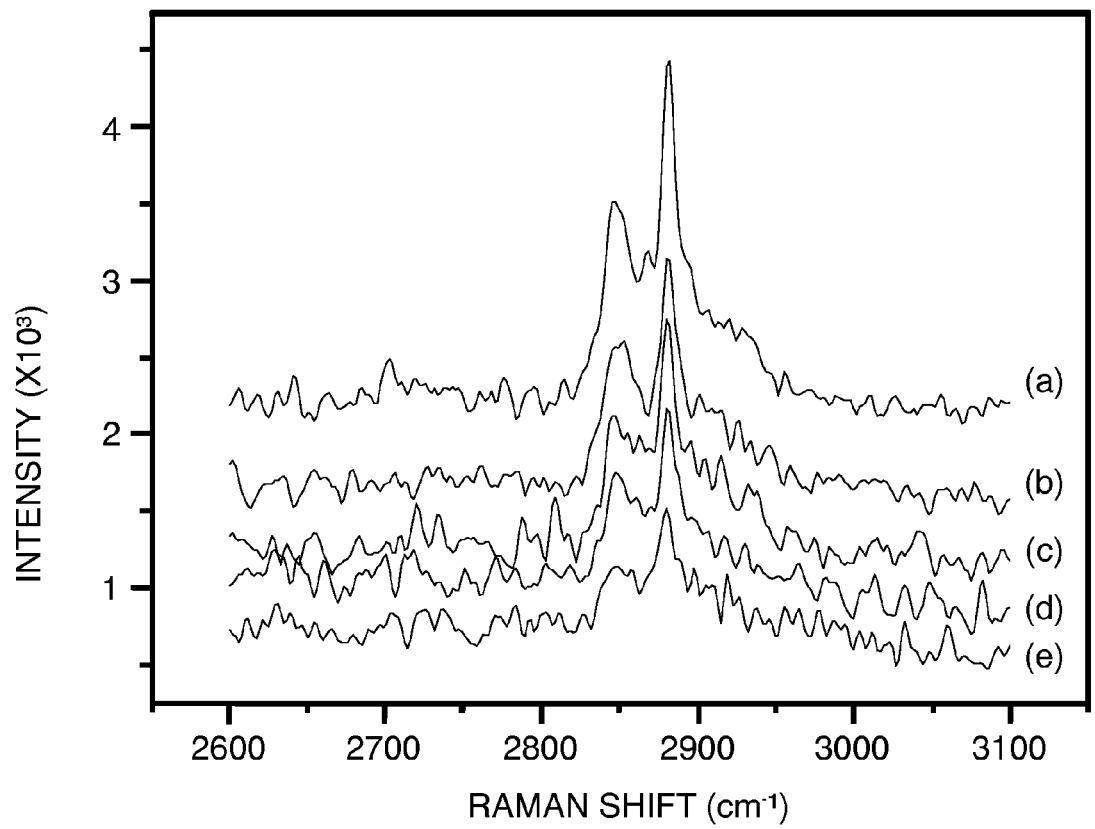
FIG. 12 shows the Raman spectra of beeswax films with thicknesses of (a) 97.2 µm, (b) 73.1 µm, (c) 67.5 µm, (d) 48.5 µm, and (e) 26.6 µm at a laser power of 120 mW.
Figure 13:
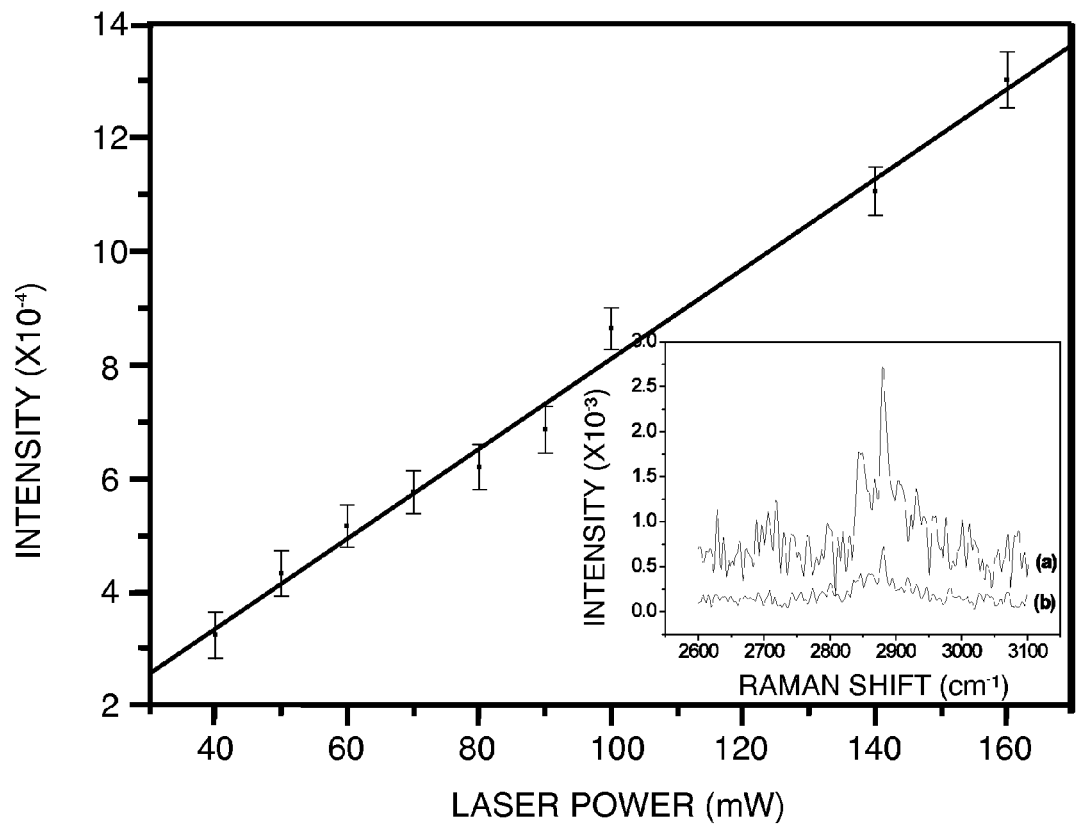
FIG. 13 shows the Raman intensity (beeswax film with a thickness of 67.5 µm) versus laser power. (Inset) Raman spectrum of the same film at two different laser powers, (a) 160 mW and (b) 40 mW.
Figure 14:
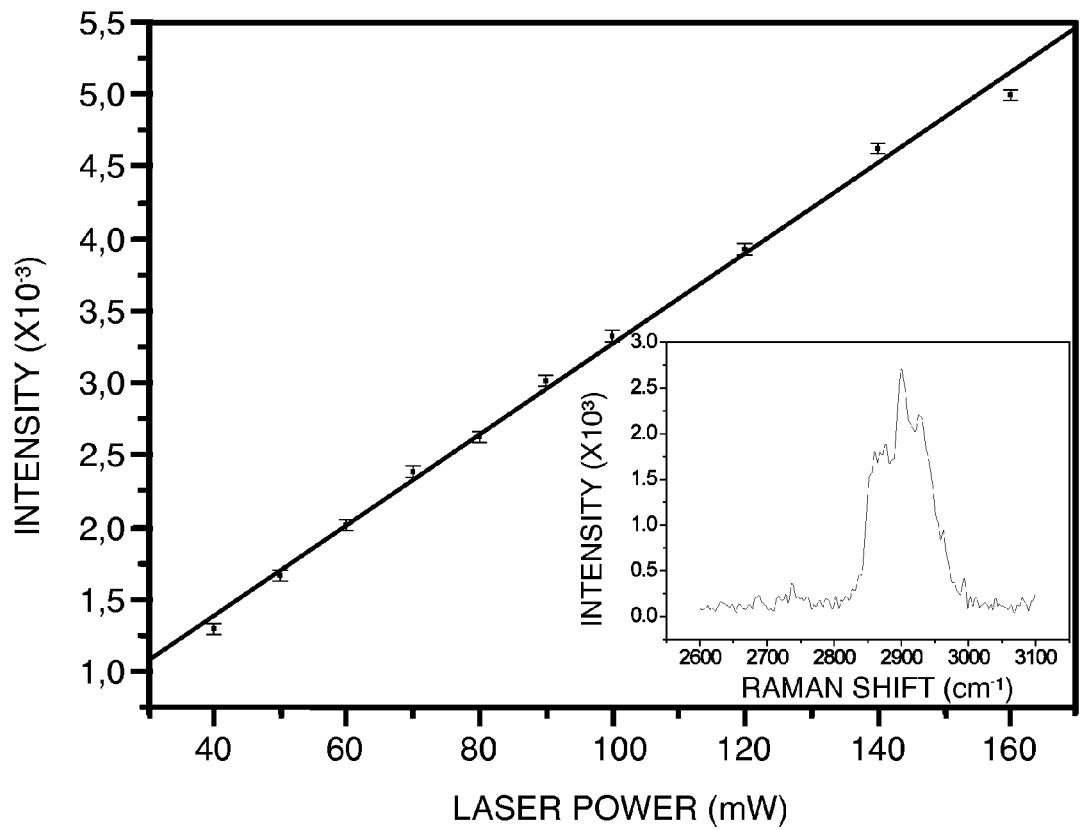
FIG. 14 shows the Raman intensity (nylon) versus laser power. (Inset) Raman spectrum of the nylon reference material (160 mW).

FIG. 12 depicts the dependence of the intensity of the characteristic beeswax peak (I c2879) with thickness of the beeswax layer. This relationship between the metric extracted from the Raman spectrum, and the desired property, the superficial thickness of beeswax will allow its measurement. However, there is a linear relationship between the Raman signal and the laser excitation intensity as displayed in FIG. 13. Therefore, in order to establish a calibration curve we need to obtain the Raman signal independently of the applied laser power, for a given thickness. FIG. 14 (inset) presents the Raman spectrum of nylon at an excitation laser power of 160 mW. For quantification we use the strongest peak situated at 2880 cm$^{-1}$. In this figure we corroborate the linear dependence of the Raman signal of nylon with the laser power as was found for beeswax.

Figure 15:
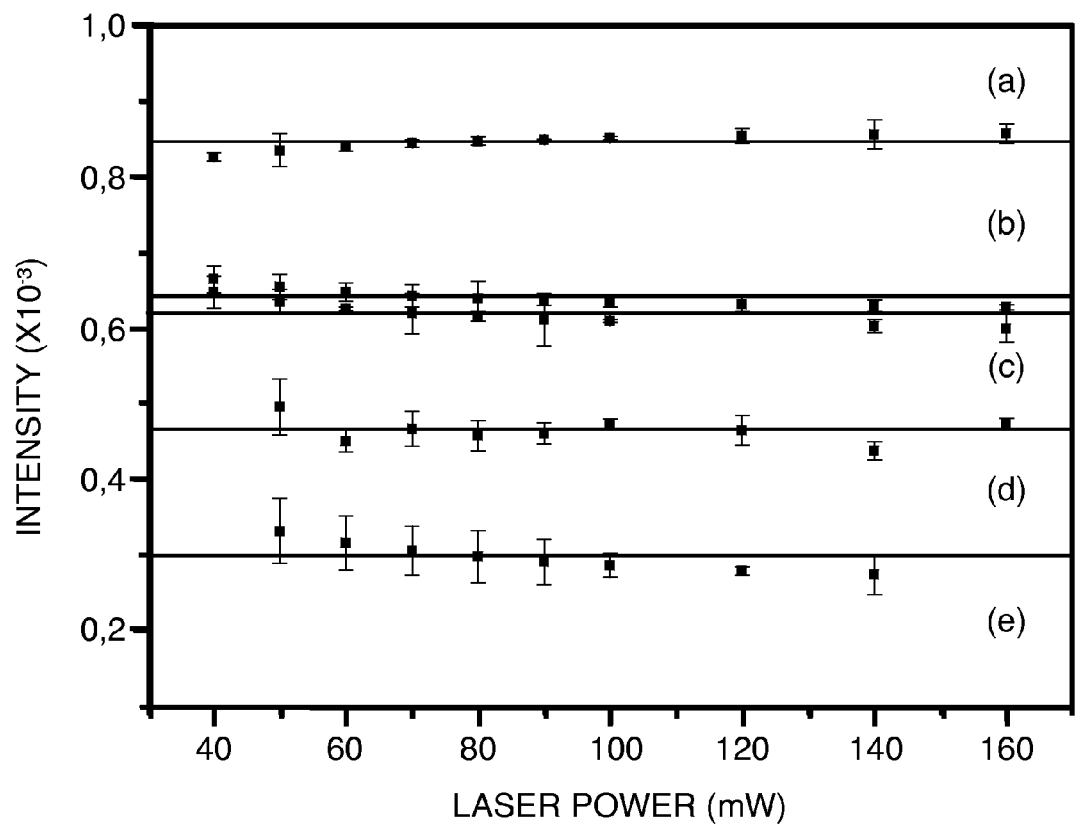
FIG. 15 shows the Normalized Raman signal versus laser power for beeswax films with thicknesses of (a) 97.2 µm, (b) 73.1 µm, (c) 67.5 µm, (d) 48.5 µm, and (e) 26.6 µm.

Thus our normalization method will consist in dividing the intensity of the characteristic peak subindex (Ic2879) in the beeswax spectra at each laser power by the corresponding nylon peak (In2880) subindex. The obtained normalized Raman signal versus the laser power is presented in FIG. 15, where we corroborate that normalized intensities are practically independent of the applied laser power.

The simpler procedure of dividing the Raman signal by the laser power instead of using an external reference was also carried out. However this procedure led to greater data dispersion than the reported here. Thus, our normalization method presents an additional advantage; it simultaneously corrects other fluctuations in the spectrometer operation, possibly not solely depending linearly on the laser power.

Figure 16:
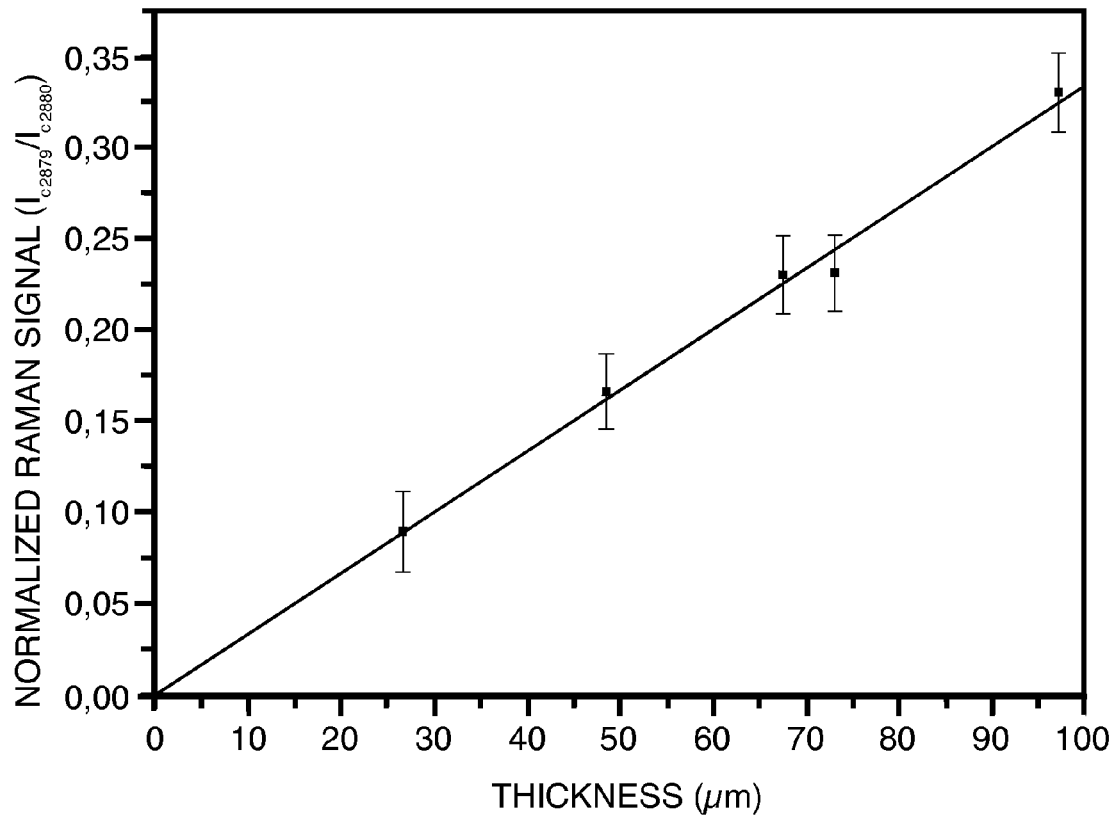
FIG. 16 shows the calibration curve for the determination of beeswax film thickness on Roan granite.

For the lowest laser powers, due to the corresponding weak Raman signal obtained, the noise enhances the measuring uncertainty. The average of these normalized Raman signals for each thickness (horizontal lines) is used to construct the thickness calibration curve obtained in FIG. 16.

This calibration curve allows quantifying the beeswax thickness over granite substratum. It fits a straight line with the following equation:

$$Y = 2 \times 10^{-4} + 3.34 \times 10^{-3} \, \mu m^{-1} X$$

The standard deviations for the intercept and the slope were ±2.7×10$^{-2}$ and ±4×10$^{-4}$ μm$^{-1}$, respectively.

B.2.3. Validation of the Calibration Model.

The goodness-of-test of the data with regard to the model was estimated by the calculation of the Q value, which amounts 0.91, resulting thus a believable goodness-of-test. To investigate the trueness of the analytical results, a set of validation samples was analized, consisting of six beeswax films having thicknesses both inside and outside the calibration range, in order to evaluate in addition the accuracy of the model at extrapolation. The thicknesses were measured by independent methods, the one for which the accuracy is to be verified (FT-Raman Spectroscopy), in direct comparison with the other methods from which their accuracy is known (contact profilometry and the measuring by a digimatic indicator).

Figure 17:
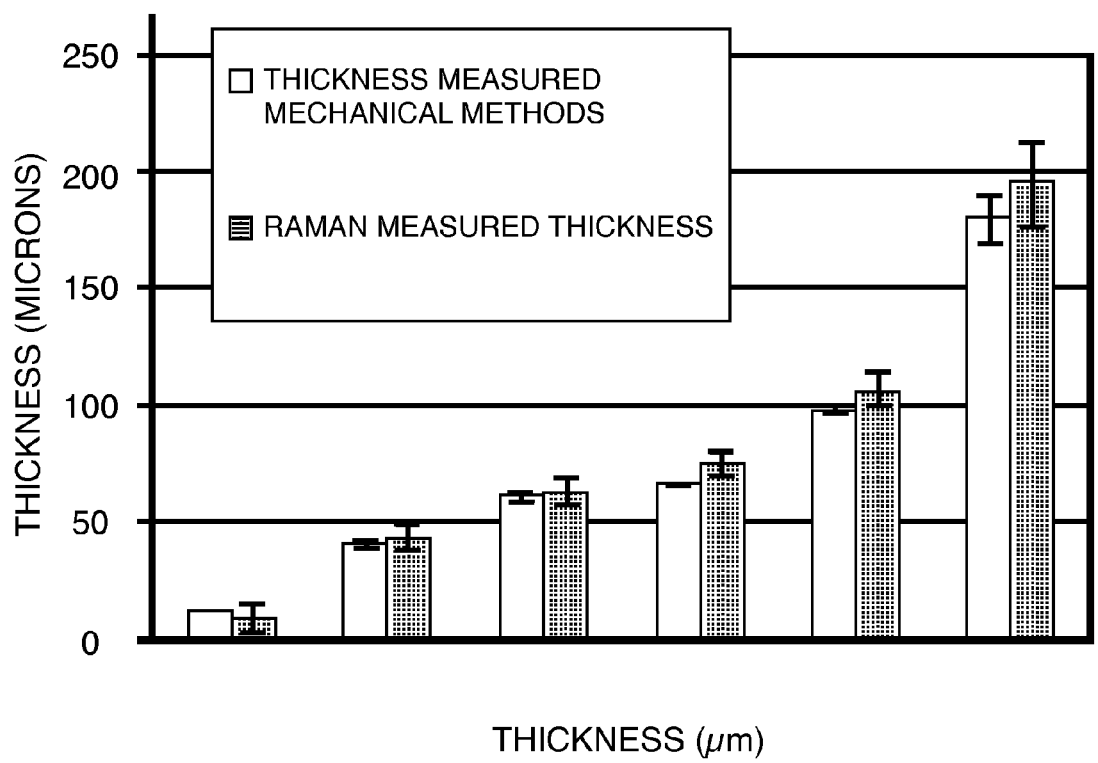
FIG. 17 shows the comparison between thicknesses of the validation samples measured by Raman spectroscopy and by mechanical methods.

FIG. 17 shows that in five out of the six validation samples, the value of the thickness measured by the mechanical methods coincides with the determined by FT-Raman, within the calculated uncertainty of measurement. This validates also our error evaluation. The only exception is the value of 75±5 μm, whereby the deviation between the two values was 2.9%. The fact that the relative uncertainty of the thinnest coating thickness amounts 77.8% shows us some limitations of the method at extrapolation below the calibration lowest range of around 25 μm on aluminium substrates. However, at extrapolation beyond the highest calibration value (>100 μm), for the 180 μm validation sample, the Raman thickness is correct and has a relative uncertainty of only 9.2%. Altogether, the validation set had a RMSEP of 6 μm which agrees with the order of magnitude of the absolute uncertainties obtained within the calibration range.

B.2.4. Thickness of Wax on Granite Stone.

Raman Spectroscopy of the beeswax was used to measure the beeswax thickness over the stone samples made in the laboratory, by measuring 9 different spots in a 3×3 grid in an area of 1 cm$^2$. The results displayed in FIG. 4 reflect the typical thickness inhomogeneity of wax on stone, as shown in the SEM micrograph of a typical cross-section of such a sample FIG. 5. Notwithstanding in these measurements on wax-granite the signal-to-noise ratio for layers below 25 μm was lower than on aluminum substratum, because the laser power used was different. Thus, the absolute uncertainties obtained at thinnest coating on stone resulted lower (≈7 μm) and more favorable to detection of the wax layer at the end of the cleaning method to be applied.

While particular embodiments and example results have been described, it is understood that, after learning the teachings contained in this disclosure, modifications and generalizations will be apparent to those skilled in the art without departing from the spirit of the disclosed embodiments.

The invention claimed is:

1. A method for removal of a contaminant substance from a porous stone monument using nondestructive means, comprising:
   (a) identifying regions of said contaminant substance embedded on said porous stone monument;
   (b) characterizing a plurality of physical properties of said contaminant embedded on said porous stone monument;
   (c) exposing said contaminant embedded on said porous stone monument to irradiation from a laser characterized by a wavelength, a pulse length, a repetition rate, and a laser energy fluence determined and optimized for a given contaminant-porous stone system based on said plurality of physical properties of said contaminant including its predominant composition and thickness,
   (d) removing said contaminant by (a) automatically identifying regions of said contaminant deposited on said porous stone monument using Fourier transform Raman spectrometry, (b) automatically characterizing said contaminant thickness using Fourier transform Raman spectrometry, and (c) exposing said contaminant to irradiation from a Nd:YAG laser characterized by a wavelength greater than 200 nm; and
   (e) adaptively evaluating the cleaning results by quantifying in-situ the remaining thickness of said contaminant.

2. The method of claim 1, wherein said identifying regions of said contaminant substance is accomplished using Fourier transform Raman spectrometry, said method optimized to remove beeswax.

3. The method of claim 1, wherein characterizing said plurality of physical properties of said contaminant is accomplished using Fourier transform Raman spectrometry and results at least in a measurement of said contaminant's thickness, said method optimized to remove beeswax.

4. The method of claim 1, wherein adaptively evaluating the cleaning results by quantifying in-situ the remaining thickness of said contaminant is accomplished using Fourier transform Raman spectrometry, said method optimized to remove beeswax.

5. The method of claim 1, wherein said laser energy density is adjusted as a function of said predominant contaminant composition, said contaminant thickness, and said porous stone's physical properties.

6. The method of claim 1, wherein said laser pulse repetition rate is adjusted to control a tradeoff between efficiency of contaminant elimination and adequate control of a cleaning procedure by an operator.

7. The method of claim 1, wherein said method is optimized to remove beeswax from a Roan granite monument in a humid environment by (a) automatically identifying regions of said beeswax deposited on said Roan granite monument using Fourier transform Raman spectrometry, (b) automatically characterizing said beeswax thickness using Fourier transform Raman spectrometry, (c) exposing said beeswax to irradiation from a Nd:YAG laser characterized by a 266 nm wavelength, and (d) adaptively evaluating the cleaning results by quantifying in-situ the remaining thickness of said beeswax.

8. The method of claim 1, wherein said Nd:YAG laser is further characterized by a 6 ns pulse length, a constant repetition rate of 10 Hz, and an energy density of 350 mJ/cm$^2$.

9. The method of claim 1, wherein said method is optimized to remove beeswax from a Roan granite monument in a humid environment by (a) automatically identifying regions of said beeswax deposited on said Roan granite monument using Fourier transform Raman spectrometry, (b) automatically characterizing said beeswax thickness using Fourier transform Raman spectrometry, (c) exposing said beeswax to irradiation from an excimer ArF laser instead of a Nd:YAG laser characterized by a 193 nm wavelength, and (d) adaptively evaluating the cleaning results by quantifying in-situ the remaining thickness of said beeswax.

10. The method of claim 9, wherein said excimer ArF laser is further characterized by a 20 ns pulse length, a constant repetition rate of 1 Hz, and a laser fluence ranging from 0.5 to 2 J cm$^{-2}$ through a UV homogenizer placed between said excimer ArF laser beam and said beeswax contaminant in order to ensure homogeneous energy density inside the laser spot.

* * * * *